(12) United States Patent
Yeon et al.

(10) Patent No.: US 10,170,961 B2
(45) Date of Patent: Jan. 1, 2019

(54) BLOWER MOTOR OF HVAC SYSTEM FOR VEHICLE

(71) Applicants: Hyundai Motor Company, Seoul (KR); Hanon Systems, Daejeon (KR); Hyoseong Electric Co., Ltd., Busan (KR)

(72) Inventors: Dong Won Yeon, Gyeonggi-do (KR); Jae Won Heo, Seoul (KR); Sang Yeop Lee, Jeollabuk-do (KR); June Kyu Park, Gyeonggi-do (KR); Jong Sik Bae, Gyeonggi-do (KR); Dong Gyun Kim, Daejeon (KR); Jin Gun Jung, Busan (KR)

(73) Assignees: Hyundai Motor Company, Seoul (KR); Hanon Systems, Daejeon (KR); Hyoseong Electric Co., Ltd., Busan (KR)

( * ) Notice: Subject to any disclaimer, the term of this patent is extended or adjusted under 35 U.S.C. 154(b) by 288 days.

(21) Appl. No.: 15/292,565

(22) Filed: Oct. 13, 2016

(65) Prior Publication Data

US 2017/0133913 A1  May 11, 2017

(30) Foreign Application Priority Data

Nov. 5, 2015 (KR) .................. 10-2015-0154860

(51) Int. Cl.
*H02K 9/22* (2006.01)
*F04D 29/58* (2006.01)
(Continued)

(52) U.S. Cl.
CPC .............. *H02K 9/22* (2013.01); *F04D 25/068* (2013.01); *F04D 25/082* (2013.01);
(Continued)

(58) Field of Classification Search
CPC . H02K 9/22; H02K 11/33; H02K 5/20; H02K 9/02; F04D 25/068; F04D 25/082; F04D 29/5806; F04D 25/06; F04D 27/004
See application file for complete search history.

(56) References Cited

U.S. PATENT DOCUMENTS 5,606,201 A * 2/1997 Lutz ...................... F28F 13/02
257/714
6,297,572 B1 * 10/2001 Sunaga ................. H02K 11/33
310/64
(Continued)

FOREIGN PATENT DOCUMENTS

JP 2002-112504 A 4/2002
JP 2007-012940 A 1/2007
(Continued)

*Primary Examiner* — Mohamad Musleh
(74) *Attorney, Agent, or Firm* — Mintz Levin Cohn Ferris Glovsky and Popeo, P.C.; Peter F. Corless

(57) ABSTRACT

A blower motor of a heating, ventilating and air conditioning (HVAC) system for a vehicle includes: a base including an introduction path to introduce air into the base and a substrate having a plurality of elements attached to the substrate, and a heat sink formed to have a plate shape in surface contact with one surface of the substrate and having a contact surface contacting the air introduced through the introduction path and configured to guide the introduced air to heat generation parts formed on the contact surface.

6 Claims, 4 Drawing Sheets

(51) Int. Cl.
*H02K 5/20* (2006.01)
*H02K 9/02* (2006.01)
*H02K 11/33* (2016.01)
*F04D 25/08* (2006.01)
*F04D 25/06* (2006.01)
*F04D 27/00* (2006.01)

(52) U.S. Cl.
CPC ........... F04D 29/5806 (2013.01); H02K 5/20 (2013.01); H02K 9/02 (2013.01); H02K 11/33 (2016.01); *F04D 25/06* (2013.01); *F04D 27/004* (2013.01)

(56) References Cited

U.S. PATENT DOCUMENTS

| | | | |
|---|---|---|---|
| 2006/0039110 A1* | 2/2006 | Foster, Sr. | F04D 19/007 |
| | | | 361/697 |
| 2008/0106159 A1* | 5/2008 | Yoshida | H02K 9/22 |
| | | | 310/50 |
| 2010/0096938 A1* | 4/2010 | Yano | F04D 29/582 |
| | | | 310/64 |
| 2015/0319839 A1* | 11/2015 | Ichikawa | F04C 18/0215 |
| | | | 310/64 |

FOREIGN PATENT DOCUMENTS

| | | |
|---|---|---|
| JP | 2014-038935 A | 2/2014 |
| KR | 10-2000-0044144 A | 7/2000 |
| KR | 2008-0027027 A | 3/2008 |
| KR | 2009-0037039 A | 4/2009 |

* cited by examiner

BLOWER MOTOR OF HVAC SYSTEM FOR VEHICLE

CROSS-REFERENCE TO RELATED APPLICATION

This application claims under 35 U.S.C. § 119(a) the benefit of Korean Patent Application No. 10-2015-0154860 filed on Nov. 5, 2015, the entire contents of which are incorporated herein by reference.

BACKGROUND (a) Technical Field

The present disclosure relates to a blower motor of a heating, ventilating and air conditioning (HVAC) system for a vehicle, more particularly, it relates to a blower motor of an HVAC system capable of improving heat dissipation efficiency of elements attached to a substrate.

(b) Description of the Related Art

In general, the HVAC system of a vehicle performs a function of introducing air of a high temperature or a low temperature to the inside of the vehicle to control indoor temperature or humidity, and is carried out by rotation of a blower fan, the blower fan being driven by a blower motor.

A power supply is connected to the blower motor connected to the blower fan such that voltage applied to the blower motor is adjusted according to a voltage control signal input so that the amount of blowing air is adjusted.

However, when a lock error (or a stall) of the motor is generated during driving of the blower motor, overcurrent is formed and thus heat is generated, thereby causing damage to the blower motor and a driving circuit.

In order to prevent damage to the blower motor during the lock error, a field effect transistor (FET) device having a heat sink may be attached to the blower motor to control the blower motor and to protect the blower motor during the lock error of the motor.

Specifically, if the blower motor is in a stalled state and thus generates heat due to overcurrent and reaches a predetermined temperature or higher, the FET device performs a function of stopping driving of the blower motor through cutoff of voltage and short-circuit of a temperature fuse using a dual safety device.

SUMMARY

The present invention provides a blower motor of a heating, ventilating and air conditioning (HVAC) system for a vehicle in which heat generation parts corresponding to some elements are uniformly disposed on a substrate in surface contact with a heat sink so as to prevent concentration of generated heat, and the heat generation parts protrude to have a step on a contact surface of the heat sink so as to increase a contact area with air.

In one aspect, the present invention provides a blower motor of a heating, ventilating and air conditioning (HVAC) system for a vehicle, including a base including an introduction path to introduce air into the base and a substrate having a plurality of elements attached to the substrate, and a heat sink formed to have a plate shape being in surface contact with one surface of the substrate and having a contact surface contacting the air introduced through the introduction path, and configured to guide the introduced air to heat generation parts formed on the contact surface.

In a preferred embodiment, the heat sink may include a pair of air guides installed on the contact surface adjacent to the introduction path and concentrating the introduced air to the heat generation parts.

In another preferred embodiment, the heat sink may include a coupling part having a coupling region formed along the edge of the heat sink so as to be fixedly coupled with the base, and a heat dissipation part formed to have a stepped shape inwardly from the coupling part to constitute the contact surface and connected to the introduction path so that heat generated from the heat generation parts is dissipated through the introduced air.

In still another preferred embodiment, a connection region having an inclination may be formed at a position of the heat dissipation part connected to the introduction path.

In yet another preferred embodiment, the heat generation parts may protrude from the contact surface of the heat sink.

In still yet another preferred embodiment, a plurality of the heat generation parts may be formed at positions corresponding to the positions of elements requiring heat dissipation among the elements attached to the substrate.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
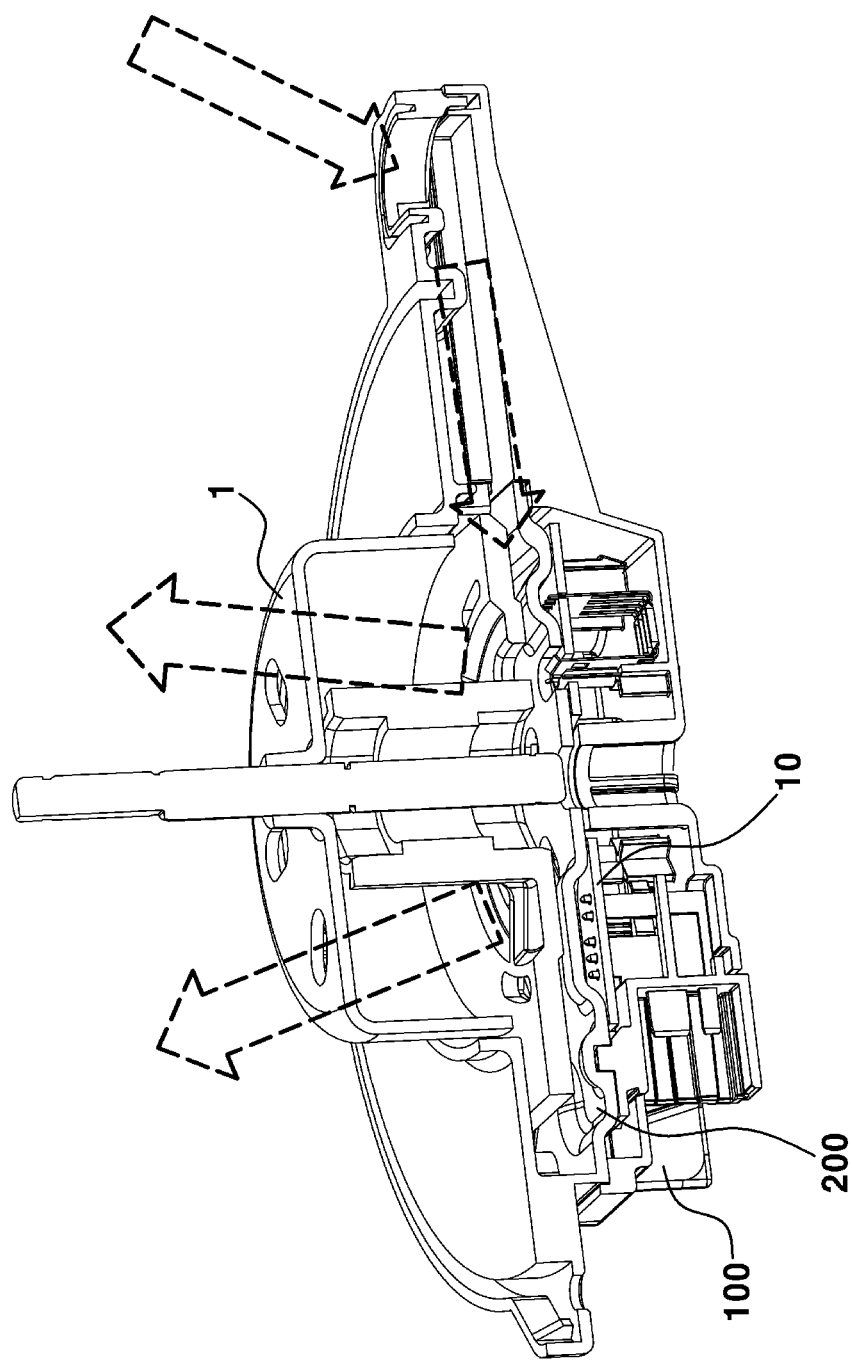
FIG. 1 is a view illustrating a flow of air introduced into a blower motor of a heating, ventilating and air conditioning (HVAC) system for a vehicle in accordance with an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
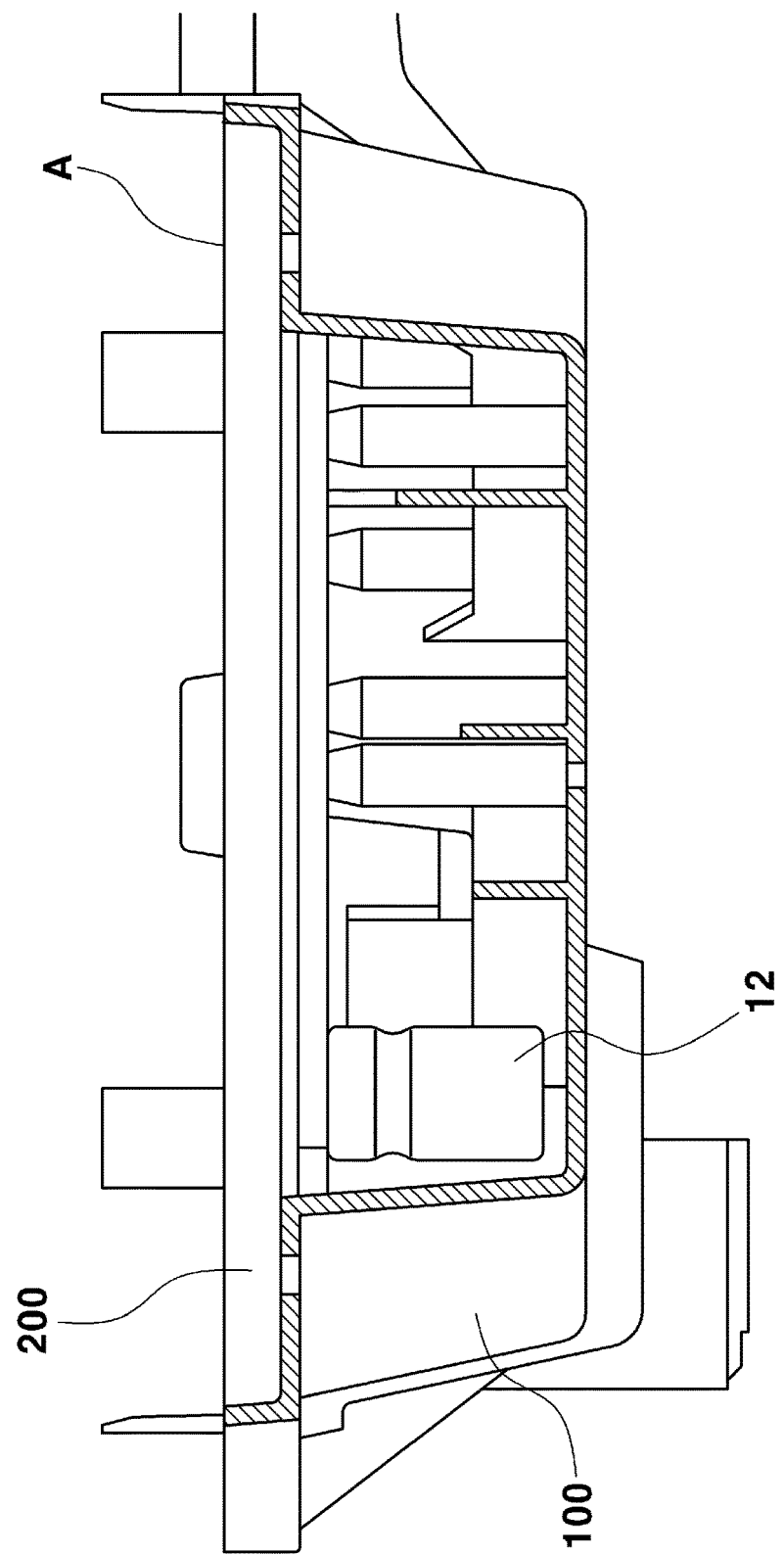
FIG. 2 is a view schematically illustrating the structure of the blower motor of the HVAC system for the vehicle in accordance with the embodiment of the present invention.

FIG. 1 is a view illustrating a flow of air introduced into a blower motor of a heating, ventilating and air conditioning (HVAC) system for a vehicle in accordance with an exemplary embodiment of the present invention and FIG. 2 is a view schematically illustrating the structure of the blower motor of the HVAC system for the vehicle in accordance with the embodiment of the present invention.

As exemplarily shown in FIGS. 1 and 2, the blower motor of the HVAC system for the vehicle includes a base 100 and a heat sink 200.

The base 100 is provided with an introduction path P, through which air is introduced into the blower motor, at one side of the base 100; and a substrate 10, to which a plurality of elements 12 is attached, is combined with the base 100.

That is, the base 100 is provided at the inside of the blower motor and has a predetermined inner space so that the substrate 10, i.e., a printed circuit board (PCB) having the elements 12, such as field effect transistors (FETs), condensers, etc., is disposed in the inner space.

If the base 100 drives a motor 1 through the elements 12 to adjust the wind velocity of the HVAC system for the vehicle, heat is generated from the elements 12. In order to dissipate such heat generated from the elements 12, the heat sink 200 is combined with one surface of the substrate 10.

The heat sink 200 is installed to dissipate heat generated from the elements 12 attached to the substrate 10. In general, heat sinks corresponding to the respective elements 12 attached to the substrate 10 are installed so as to respectively dissipate heat generated from the elements 12.

However, in this case, an increase in the number of the heat sinks may cause an increase not only in manufacturing costs of a blower motor but also in the size of the blower motor.

Therefore, in the described embodiment, heat sinks to dissipate heat generated from the respective elements 12 are not used, but one plate-shaped heat sink 200 which fixes the motor 1 is manufactured so as to dissipate heat generated from the elements 12.

That is, the heat sink 200 is formed to have a plate shape with a contact surface A contacting air introduced from the introduction path P, is in surface contact with one surface of the substrate 10, and guides introduced air to heat generation parts 210 formed on the contact surface A, thereby dissipating heat generated from the elements 12 attached to the substrate 10 using introduced air.

In particular, the heat generation parts 210 formed on the contact surface A protrude at positions corresponding to the positions of elements 12 requiring a large amount of heat dissipation, such as FETs, condensers, etc., among the elements 12 attached to the substrate 10, and thus, introduced air may move towards the protruding heat generation parts 210 to dissipate heat generated from the elements 12.

Figure 3:
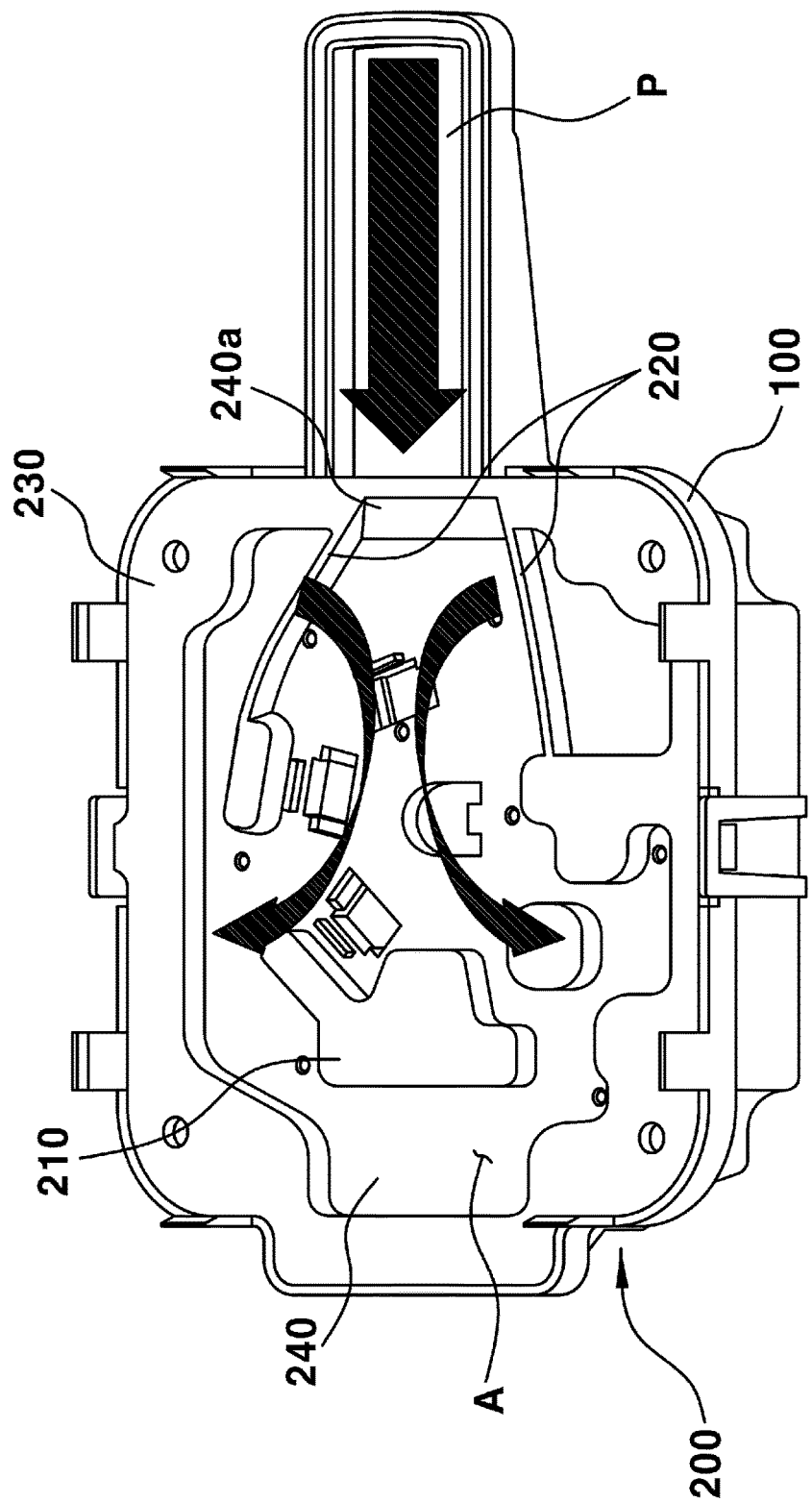
FIG. 3 is a view illustrating air guides of the blower motor of the HVAC system for the vehicle in accordance with the embodiment of the present invention.
Figure 4:
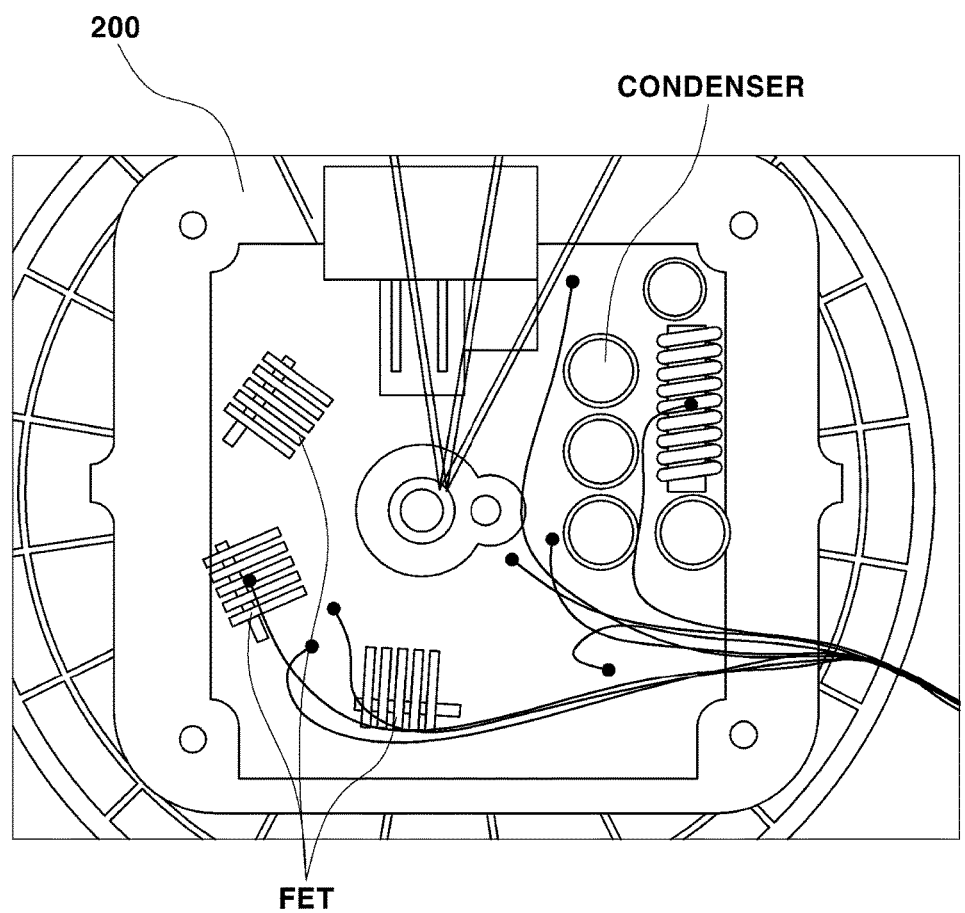
FIG. 4 is a view illustrating the structure of a substrate of the blower motor of the HVAC system for the vehicle in accordance with the embodiment of the present invention.

FIG. 3 is a view illustrating air guides of the blower motor of the HVAC system for the vehicle in accordance with the embodiment of the present invention, and FIG. 4 is a view illustrating the structure of the substrate of the blower motor of the HVAC system for the vehicle in accordance with the embodiment of the present invention.

As exemplarily shown in FIG. 3, the heat sink 200 preferably is in the shape of a plate, so as to be in surface contact with one surface of the substrate 10, and includes a coupling part 230 and a heat dissipation part 240.

The coupling part 230 has a coupling region having a plurality of bolt holes, formed along the edge of the heat sink 200, so as to be fixedly coupled with the base 100.

The heat dissipation part 240 is formed to have a stepped shape inwardly from the coupling part 230 and thus constitutes the contact surface A. One side of the heat dissipation part 240 is connected to the introduction path P so that heat dissipation is carried out at the heat generation parts 210 through introduced air.

The heat dissipation part 240 has an inclined connection region 240a at a position connected to the introduction path P. Since the connection region 240a has a predetermined inclination, air introduced into the heat dissipation part 240 may easily move to the contact surface A.

A plurality of heat generation parts 210 protruding from the heat dissipation part 240 is distributed and the heat generation parts 210 are formed at positions corresponding to the positions of elements 12 requiring a large amount of heat dissipation, such as FETs, condensers, etc., so that introduced air is concentrated on the heat generation parts 210, thereby increasing heat dissipation efficiency of the elements 12.

In particular, since the heat generation parts 210 protruding from the heat dissipation part 240 are distributed on the heat dissipation part 240 at positions corresponding to the positions of the elements 12 distributed on the substrate 10 so as to effectively dissipate heat through introduced air, a contact area with introduced air may be increased, and consequently, introduced air may be concentrated on the heat generation parts 210.

In the heat sink 200 in accordance with the embodiment of the present invention, a plurality of air guides 220 is installed.

Here, a pair of air guides 220 is installed on the contact surface A adjacent to the introduction path P so as to concentrate introduced air on the heat generation parts 210.

In particular, the air guides 220 are formed to connect the heat dissipation part 240 to the connection region 240a, and may guide introduced air moving from the introduction path P to the heat dissipation part 240 so as to move to the heat dissipation part 240 along the inner surfaces of the air guides 220.

Such air guides 220 may be formed to have the same height as that of the heat generation parts 210, and installed in diagonal directions such that the inner surfaces of the air guides 220 become distant from each other in an inside direction of the heat dissipation part 240. Accordingly, the air guides 220 may distribute introduced air widely along the inclination of the air guides 220, thus effectively transmitting introduced air to the entirety of the heat generation parts 210 which are distributed on the contact surface A.

As is apparent from the above description, a blower motor of a heating, ventilating and air conditioning (HVAC) system for a vehicle in accordance with the present invention disposes heat dissipation parts corresponding to some of a plurality of elements uniformly on a substrate in surface contact with a heat sink so as to prevent concentration of generated heat, and causes the heat dissipation parts to protrude to have a step on a contact surface of the heat sink so as to increase a contact area with air.

Further, the blower motor of the HVAC system for a vehicle in accordance with the present invention includes air guides installed on the contact surface of the heat sink so as to concentrate introduced air on the heat generation parts corresponding to some elements, thereby effectively guiding movement of introduced air and improving heat dissipation efficiency of the elements.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A blower motor of a heating, ventilating and air conditioning (HVAC) system for a vehicle, comprising:
   a base including an introduction path to introduce air into the base and a substrate having a plurality of elements attached to the substrate; and
   a heat sink formed to have a plate shape being in surface contact with one surface of the substrate and having a contact surface contacting the air introduced through the introduction path, and configured to guide the introduced air to heat generation parts formed on the contact surface.

2. The blower motor of claim 1, wherein the heat sink includes a pair of air guides installed on the contact surface adjacent to the introduction path, and concentrating the introduced air on the heat generation parts.

3. The blower motor of claim 1, wherein the heat sink includes:
   a coupling part having a coupling region formed along the edge of the heat sink so as to be fixedly coupled with the base; and
   a heat dissipation part formed to have a stepped shape inwardly from the coupling part to constitute the contact surface and connected to the introduction path so that heat generated from the heat generation parts is dissipated through the introduced air.

4. The blower motor of claim 3, wherein the heat dissipation part comprises a connection region having an inclination at a position connected to the introduction path.

5. The blower motor of claim 1, wherein the heat generation parts protrude from the contact surface of the heat sink.

6. The blower motor of claim 1, wherein a plurality of the heat generation parts are formed at positions corresponding to the positions of elements requiring heat dissipation among the elements attached to the substrate.

\* \* \* \* \*